J. B. NIXON.
Seed-Sowers.

No. 146,198.  Patented Jan. 6, 1874.

Witnesses  
John L. Borne  
Milton Richardson

John B. Nixon  
by Dewey & Co  
Attys

UNITED STATES PATENT OFFICE.

JOHN B. NIXON, OF COTTONWOOD, CALIFORNIA.

IMPROVEMENT IN SEED-SOWERS.

Specification forming part of Letters Patent No. 146,198, dated January 6, 1874; application filed October 4, 1873.

*To all whom it may concern:*

Be it known that I, JOHN B. NIXON, of Cottonwood, Yolo county, State of California, have invented an Improved Seed-Sower; and I do hereby declare the following description and accompanying drawings are sufficient to enable any person skilled in the art or science to which it most nearly appertains to make and use my said invention or improvement without further invention or experiment.

My invention relates to an improvement in broadcast seed-sowers by which I am enabled to scatter the seed more uniformly and evenly than the ordinary seed-sowers of this class.

The difficulty heretofore encountered with broadcast seed-sowers was the impossibility of scattering the grain evenly over all parts of the field. This difficulty was caused by the rotation of the distributer in one direction all of the time, no matter in which direction the machine was traveling. For instance, the machine in passing across a field in one direction scatters the seed mostly to one side; the seed would, consequently, be sowed thicker near the machine than at a distance from it. When the machine is turned at the end of line to sow another land the same thing is repeated, thus leaving the grain sowed thick and thin, alternately.

My improvement consists in a combination and arrangement of the several parts of the sower, as hereinafter described.

Figure 1:
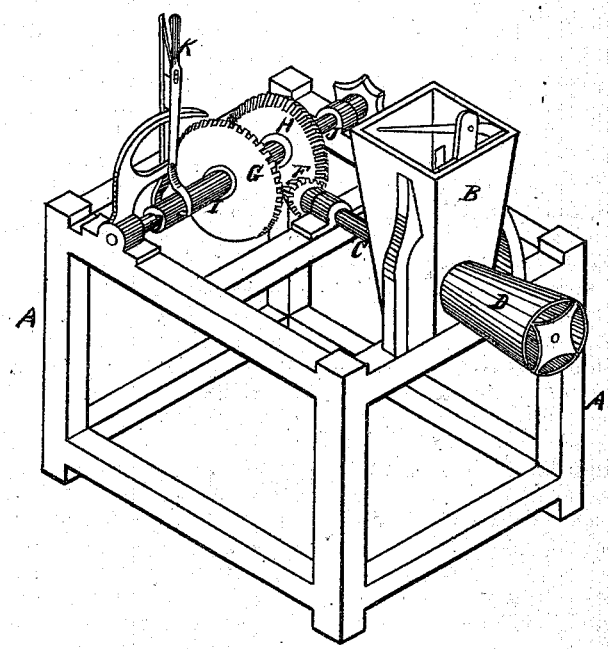
Figure 2:
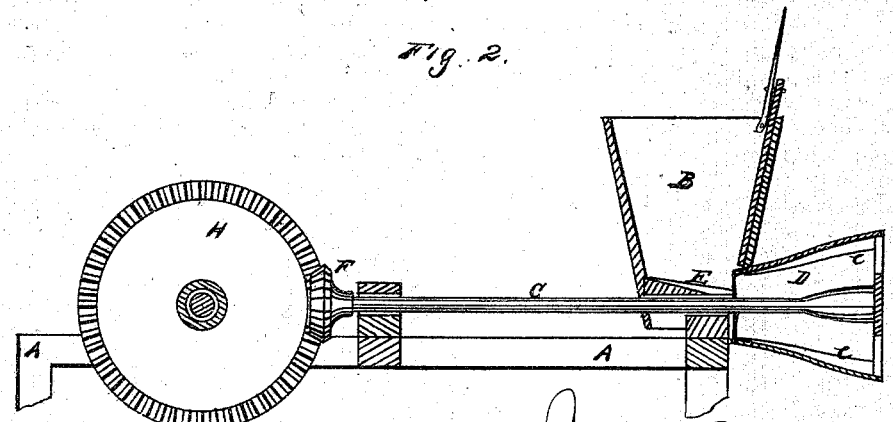

Referring to the accompanying drawings for a more complete explanation of my invention, Figure 1 is a perspective view of my machine. Fig. 2 is a longitudinal section.

In the present case I have employed a frame, A, upon which to mount the necessary machinery; but it is manifest that the upper part of this or another suitable frame might be mounted upon wheels in the manner usual to seed-sowers. At one end of this frame is placed the receiving-hopper B. Beneath this hopper the shaft C passes horizontally, and at its outer extremity the conical seed-distributer D is secured. The seed is led from the hopper B into the distributer by means of a spout, E, which surrounds the shaft C, but is cut away toward the distributer, as shown, for the admission of the seed. Within the distributer are rifles or ribs e, extending longitudinally, which assist in giving a whirling motion to the seed as it leaves the larger end of the distributer, which, as before mentioned, is shaped like the frustum of a cone. The effect of this distributer is to throw the seed to some distance each way; but it is always more thickly scattered in a line which occupies a position a little to one side of the distributer, and when the machine is turned to come back the seed is again thrown irregularly. In order to remedy this difficulty I construct a reversing-gear, which can be shifted so that the distributer will be rotated in opposite directions as it moves alternately up and down the field, and this causes the line of thickly-sown seed to overlap the thinner line, and by this compensation the whole field will be evenly sown. Upon the end of the shaft C is a bevel-pinion, F, which is rotated alternately to the left and right by the bevel-gears G and H. These gears are mounted upon the sleeve I, which slides upon a feather in the transverse shaft J. This sleeve is operated by a clutch-lever K, by which either gear can be thrown into contact with the pinion F. The shaft J may be driven by suitable connections from the driving-wheels. By this arrangement I am enabled to employ one of the driving-gears G H to operate the distributer while the machine is passing across the field in one direction, and after the machine is turned to come back the other gear is thrown into contact with the pinion F, thus operating to drive the distributer in an opposite direction, so that the part of the field which was thinly covered with seed by the first passage of the machine will be overlapped by the thicker distribution upon the return of the machine.

Having thus described my invention, what I claim as new, and desire to secure by Letters Patent, is—

1. The conical seed-distributer D, secured to the shaft C at its outer and larger end, the interior being furnished with longitudinal ribs e, in combination with the seed-box B, as and for the purpose set forth.

2. In combination with the distributer D and shaft C, constructed as described, the shifting-gears F G H, as and for the purpose described.

In witness whereof I hereunto set my hand and seal.

JOHN B. NIXON. [L. S.]

Witnesses:
JOHN L. BOONE,
C. M. RICHARDSON.